(12) United States Patent
Abe et al.

(10) Patent No.: US 12,244,154 B2
(45) Date of Patent: Mar. 4, 2025

(54) CHARGER

(71) Applicant: TOYODA GOSEI CO., LTD., Kiyosu (JP)

(72) Inventors: Teppei Abe, Kiyosu (JP); Shinichiro Fuki, Kiyosu (JP); Tomokazu Sakai, Kiyosu (JP); Shigeo Takeda, Kiyosu (JP); Yuki Tokuyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 69 days.

(21) Appl. No.: 18/124,281

(22) Filed: Mar. 21, 2023

(65) Prior Publication Data
US 2023/0318357 A1 Oct. 5, 2023

(30) Foreign Application Priority Data
Mar. 29, 2022 (JP) .................... 2022-053413

(51) Int. Cl.
*H02J 50/12* (2016.01)
*B60R 16/02* (2006.01)
*H02J 7/00* (2006.01)
*H02J 50/00* (2016.01)
*H02J 50/20* (2016.01)

(52) U.S. Cl.
CPC ............. *H02J 50/12* (2016.02); *B60R 16/02* (2013.01); *H02J 7/007* (2013.01); *H02J 50/005* (2020.01); *H02J 50/20* (2016.02)

(58) Field of Classification Search
CPC .......... H02J 50/12; H02J 7/007; H02J 50/005; H02J 50/20; B60R 16/02
See application file for complete search history.

(56) References Cited

U.S. PATENT DOCUMENTS

| | | | | |
|---|---|---|---|---|
| 2011/0260681 A1* | 10/2011 | Guccione | ................ | H02J 7/342 320/108 |
| 2018/0198313 A1* | 7/2018 | Lee | .......................... | H02J 50/60 |
| 2020/0244109 A1* | 7/2020 | Song | .................... | H04B 7/15507 |

FOREIGN PATENT DOCUMENTS

JP         2018-113849 A       7/2018

* cited by examiner

*Primary Examiner* — Lincoln D Donovan
*Assistant Examiner* — Alex W Lam
(74) *Attorney, Agent, or Firm* — Posz Law Group, PLC (57) ABSTRACT

A charger includes a power receiving unit, a power storage unit, and a power transmission unit. The power receiving unit is configured to receive, through wireless power supply via radio waves, power transmitted from a power transmitting device disposed in a vehicle. The power storage unit is configured to be supplied and charged with the power received by the power receiving unit. The power transmission unit is configured to transmit, through wireless power supply via electromagnetic induction, the power stored in the power storage unit to an electrical device that is to be charged.

4 Claims, 5 Drawing Sheets

CHARGER

BACKGROUND

1. Field

The present disclosure relates to a charger used to charge an electrical device.

2. Description of Related Art

Recently, various types of chargers used to charge an electrical device (e.g., a smartphone, a tablet terminal, and wireless earphones) have been proposed and used. Typical examples of the chargers in practical use include a charger connected to an electrical device by a cable to perform power supply in a wired manner. The examples also include a charger that is wirelessly connected to an electrical device to perform wireless power supply. This charger includes a housing and a transmission-side coil located in the housing. When an electrical device that is to be charged is placed on the housing of the charger, the electrical device (specifically, a storage battery included in the electrical device) is charged via electromagnetic induction that occurs between a reception-side coil of the electrical device and the transmission-side coil of the charger.

Electrical devices are charged inside a vehicle such as an automobile (e.g., in the passenger compartment) more often. During use, the charger is connected to a power source terminal (e.g., an accessory socket or a universal serial bus (USB) port) by a connection cord. In this case, the charger can be installed only at a location relatively near the power source terminal. Thus, the charger is not easy to use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A charger that solves the above problem includes a power receiving unit configured to receive, through wireless power supply via radio waves, power transmitted from a power transmitting device disposed in a vehicle, a power storage unit configured to be supplied and charged with the power received by the power receiving unit, and a power transmission unit configured to transmit, through wireless power supply via electromagnetic induction, the power stored in the power storage unit to an electrical device that is to be charged.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A charger 20 according to an embodiment will now be described.

Figure 1:
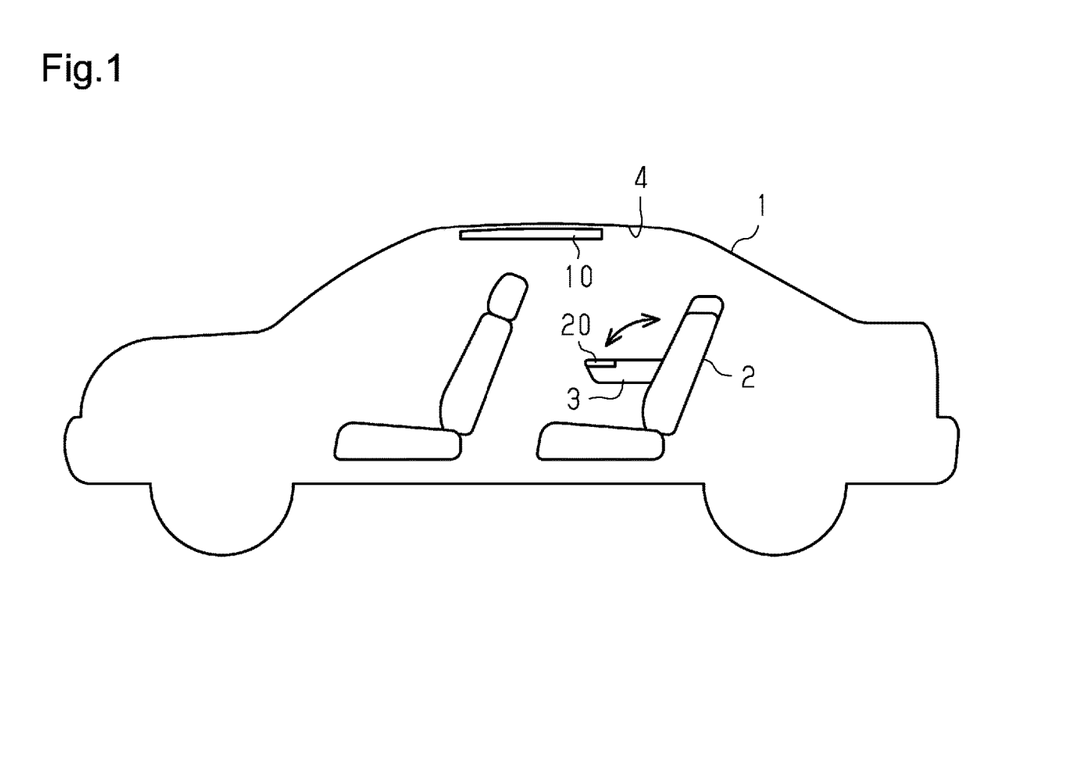
FIG. 1 is a diagram schematically showing a vehicle in which a charger according to an embodiment is employed.

As shown in FIG. 1, the charger 20 of the present embodiment is located in a vehicle 1; specifically, on an armrest 3 for a rear seat 2. The armrest 3 is movable as shown by the arrow in FIG. 1. The charger 20 is attached to the armrest 3 in a removable manner. In the present embodiment, the armrest 3 corresponds to a vehicle on-board component disposed in the passenger compartment. Further, a power transmitting device 10 is disposed in the vehicle 1; specifically, on a ceiling wall 4 of the passenger compartment.

Figure 2:
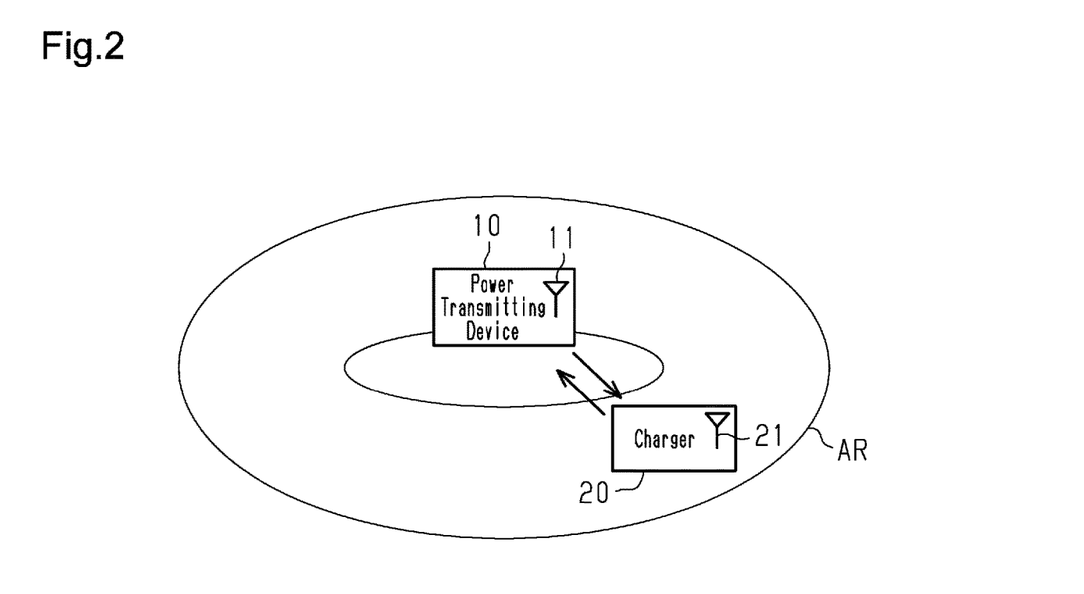
FIG. 2 is a diagram schematically showing the relationship between the charger and the power transmitting device.

As shown in FIG. 2, the charger 20 of the present embodiment is charged with power transmitted from the power transmitting device 10. The power transmitting device 10 supplies power to the charger 20 through wireless power supply via radio waves (microwaves in the present embodiment). Specifically, a power transfer signal used for wireless power supply is transmitted and received to and from a power transmitting antenna 11 and a power receiving antenna 21 of the charger 20.

The charger 20 transmits a beacon signal including position information to the power transmitting device 10 at a predetermined time interval. When the charger 20 is located within a power transmittable range AR, the power transmitting device 10 receives the beacon signal of the charger 20. Upon receipt of the beacon signal of the charger 20, the power transmitting device 10 uses the beacon signal to identify the position of the charger 20. By transmitting the power transfer signal to the identified position, the power transmitting device 10 wirelessly supplies power to the charger 20. This allows the charger 20 to be efficiently supplied with power depending on, for example, the orientation of the charger 20 relative to the power transmitting device 10 or the distance between the power transmitting device 10 and the charger 20.

Power Transmitting Device 10

Figure 3:
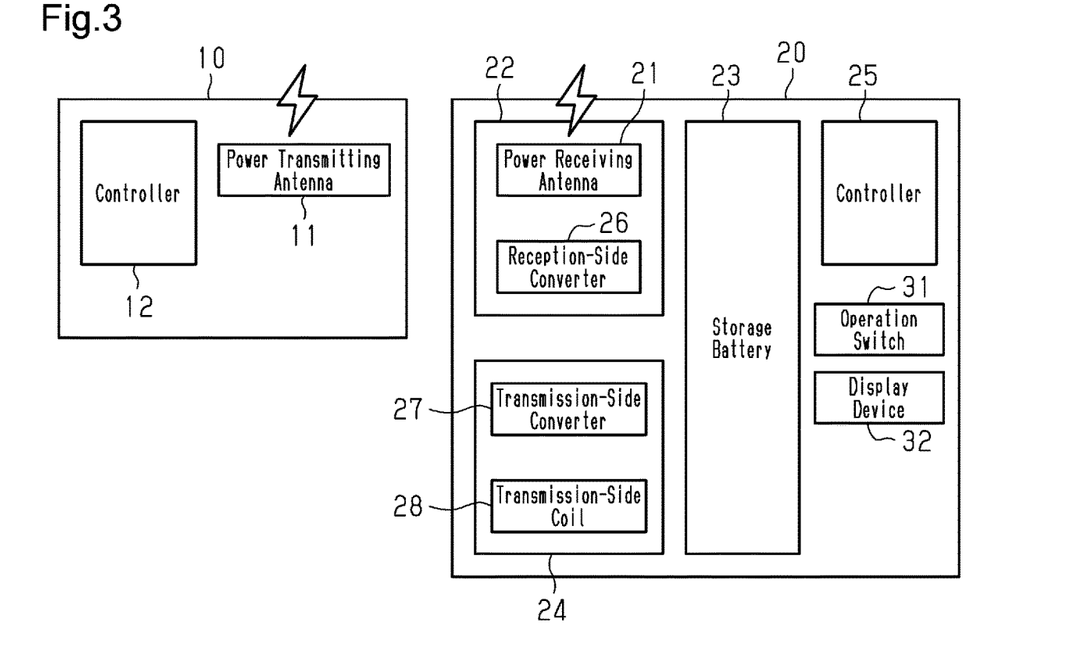
FIG. 3 is a diagram schematically showing the configurations of the charger and the power transmitting device.

As shown in FIG. 3, the power transmitting device 10 includes the power transmitting antenna 11 and a controller 12. The power transmitting device 10 is connected to a power supply circuit of the vehicle 1 by a wire harness. The power transmitting device 10 is supplied with power from the power supply circuit of the vehicle 1 through the wire harness.

The power transmitting antenna 11 is used for various types of communication with the charger 20. The power transmitting antenna 11 is used to transmit a power transfer signal and receive a beacon signal.

Examples of the controller 12 include a micro-control unit. The controller 12 may be processing circuitry that includes a processor and a memory. The memory includes a random access memory (RAM) and a read-only memory (ROM). The controller 12 executes various types of control related to communication with the charger 20. The controller 12 controls the power transmitting antenna 11 to receive a beacon signal transmitted from the charger 20. The controller 12 converts the power supplied from a power supply device (not shown) into a power transfer signal and transmits the power transfer signal to the charger 20 using the power transmitting antenna 11.

Charger 20

The charger 20 includes a power receiving unit 22, a storage battery 23, a power transmitting unit 24, and a controller 25.

Power Receiving Unit 22

The power receiving unit 22 forms a section that receives, through wireless power supply via radio waves, the power transmitted from the power transmitting device 10. The power receiving unit 22 includes the power receiving antenna 21 and a reception-side converter 26.

The power receiving antenna 21 is used for various types of communication with the power transmitting device 10. Specifically, the power receiving antenna 21 is used to receive a power transfer signal transmitted from the power transmitting device 10 and transmit a beacon signal to the power transmitting device 10.

The reception-side converter 26 forms a section that converts the power transfer signal received by the power receiving antenna 21 into direct-current power. The reception-side converter 26 includes a rectifying circuit and a voltage changing circuit. In the charger 20 of the present embodiment, when the direct-current power obtained through conversion by the reception-side converter 26 is supplied to the storage battery 23, the storage battery 23 is charged.

Power Transmitting Unit 24

The power transmitting unit 24 forms a section that transmits, through wireless power supply via electromagnetic induction, the power stored in the storage battery 23 to an electrical device that is to be charged. In the present embodiment, the wireless power supply performed by the power transmitting unit 24 conforms to a standard called Qi, which is a global standard defined by Wireless Power Consortium (WPC). The wireless power supply performed by the power transmitting unit 24 may conform to another standard, such as Power Matters Alliance (PMA). The electrical device may be, for example, a smartphone, a tablet terminal, or wireless earphones.

The power transmitting unit 24 includes a transmission-side converter 27 and a transmission-side coil 28. The transmission-side converter 27 includes an inverter circuit. The transmission-side converter 27 forms a section that converts the direct-current power supplied from the storage battery 23 into alternating-current power. The transmission-side coil 28 is formed by a wound wire. In the charger 20 of the present embodiment, the transmission-side coil 28 is supplied with the alternating-current power obtained through conversion by the transmission-side converter 27.

In the charger 20 of the present embodiment, the direct-current power supplied from the storage battery 23 is basically converted into alternating-current power by the transmission-side converter 27. The alternating-current power is transmitted to the transmission-side coil 28. This causes the transmission-side coil 28 to produce magnetic flux for wireless power supply via electromagnetic induction.

Controller 25

Examples of the controller 25 include a micro-control unit. The controller 25 may be processing circuitry that includes a processor and a memory. The memory includes a RAM and a ROM. The controller 25 executes various types of control related to activation control of the charger 20 (specifically, activation control of the power receiving unit 22 and the power transmitting unit 24). The controller 25 controls the power receiving antenna 21 to transmit a beacon signal to the power transmitting device 10. The controller 25 controls the power receiving antenna 21 to receive a power transfer signal that is transmitted from the power transmitting device 10. The controller 25 converts the direct-current power supplied from the storage battery 23 into alternating-current power and supplies the alternating-current power to the transmission-side coil 28.

Housing 30

Figure 4:
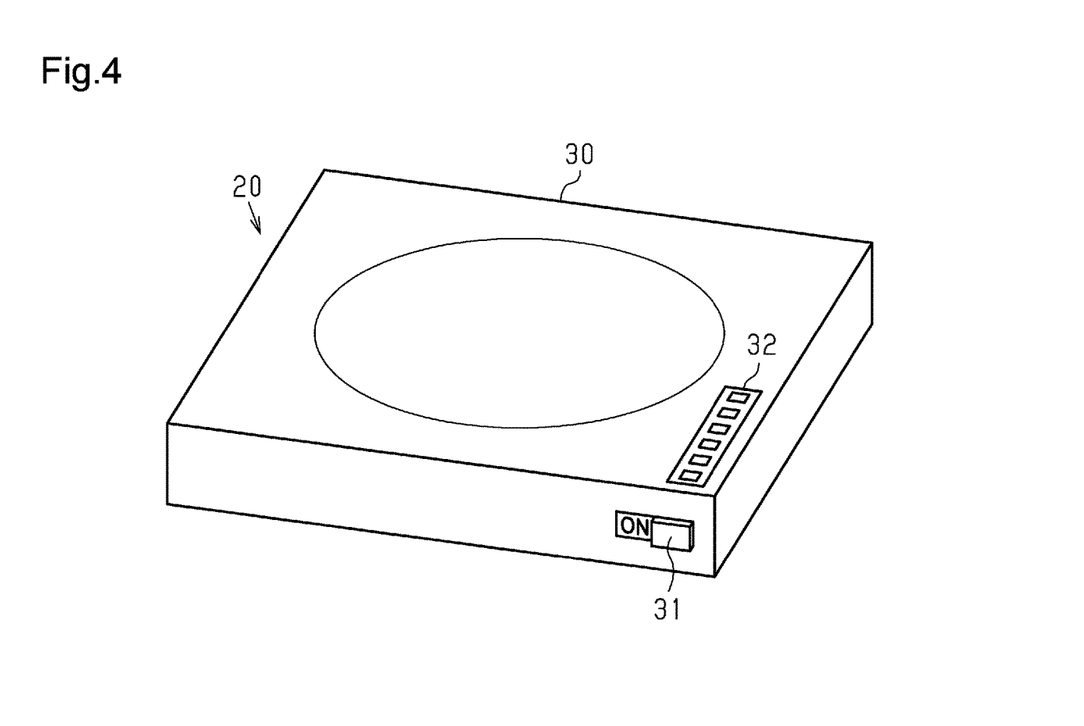
FIG. 4 is a perspective view of the charger.

As shown in FIG. 4, the charger 20 includes a housing 30. The housing 30 accommodates the power receiving unit 22, the storage battery 23, the power transmitting unit 24, and the controller 25.

To charge an electrical device using the charger 20, the electrical device is placed on the housing 30. This causes the electrical device to be charged through wireless power supply via electromagnetic induction. Specifically, when power is applied to the transmission-side coil 28 of the charger 20, magnetic flux is produced. The charger 20 is configured such that the magnetic flux produced by the transmission-side coil 28 is linked to a reception-side coil of the electrical device when the electrical device is placed at a predetermined position on the housing 30. The magnetic flux linked to the reception-side coil of the electrical device produces an induced electromotive force in the reception-side coil of the electrical device. The induced electromotive force is used to charge the storage battery of the electrical device.

An operation switch 31 is attached to the housing 30. The operation switch 31 is connected to the controller 25 of the charger 20 (see FIG. 3). The operation switch 31 is a slide switch operated by a user of the charger 20. Based on how the user operates the operation switch 31, the controller 25 switches between a state in which power transmission from the power transmitting unit 24 to the electrical device is permitted (power transmission permitted state) and a state in which the power transmission is prohibited (power transmission prohibited state). The arrangement of the operation switch 31 allows the power transmitting unit 24 to be activated when the electrical device is charged. This prevents situations in which the power transmitting unit 24 is activated although the electrical device is not charged. Thus, the power transmitting unit 24 is prevented from consuming power more than necessary.

A display device 32 is attached to the housing 30. The display device 32 includes light-emitting diodes arranged in a row. The display device 32 is connected to the controller 25 (see FIG. 3). The display device 32 displays information corresponding to the remaining battery level (state of charge (SOC)) of the storage battery 23 through activation control performed by the controller 25. The color (e.g., green) displayed by the display device 32 when the remaining battery level SOC is greater than or equal to a predetermined amount is different from the color (e.g., red) displayed when the remaining battery level SOC is less than the predetermined amount. Based on the information displayed on the display device 32 (specifically, the number of light-emitting diodes turned on) and the display color, the user readily determines that the charger 20 stores enough power to charge the electrical device or stores a relatively small amount of power. The remaining battery level SOC is obtained by the controller 25 based on, for example, the power received by the power receiving unit 22, the voltage of the storage battery 23, and the power transmitted by the power transmitting unit 24.

Storage Battery 23

The charger 20 of the present embodiment has a structure in which the storage battery 23 is replaceable. Specifically, the housing 30 includes a battery accommodation portion (not shown) that can accommodate the storage battery 23 and a lid (not shown) that can open and close the battery accommodation portion. With the storage battery 23 accommodated in the battery accommodation portion, the lid in a closed state is attached to the housing 30. In such a structure, when the storage battery 23 deteriorates, the components of the charger 20 other than the storage battery 23 can be reused by replacing the storage battery 23 with a new one.

The operational advantage obtained from the charger 20 of the present embodiment will now be described.

Power Reception by Power Receiving Unit 22 from Power Transmitting Device 10

As shown in FIG. 2, the charger 20 controls the power receiving antenna 21 to transmit a beacon signal. The power transmitting device 10 controls the power transmitting antenna 11 to receive the beacon signal that has been transmitted from the charger 20. Upon receipt of the beacon signal, the power transmitting device 10 controls the power transmitting antenna 11 to send a power transfer signal to the charger 20.

Figure 5:
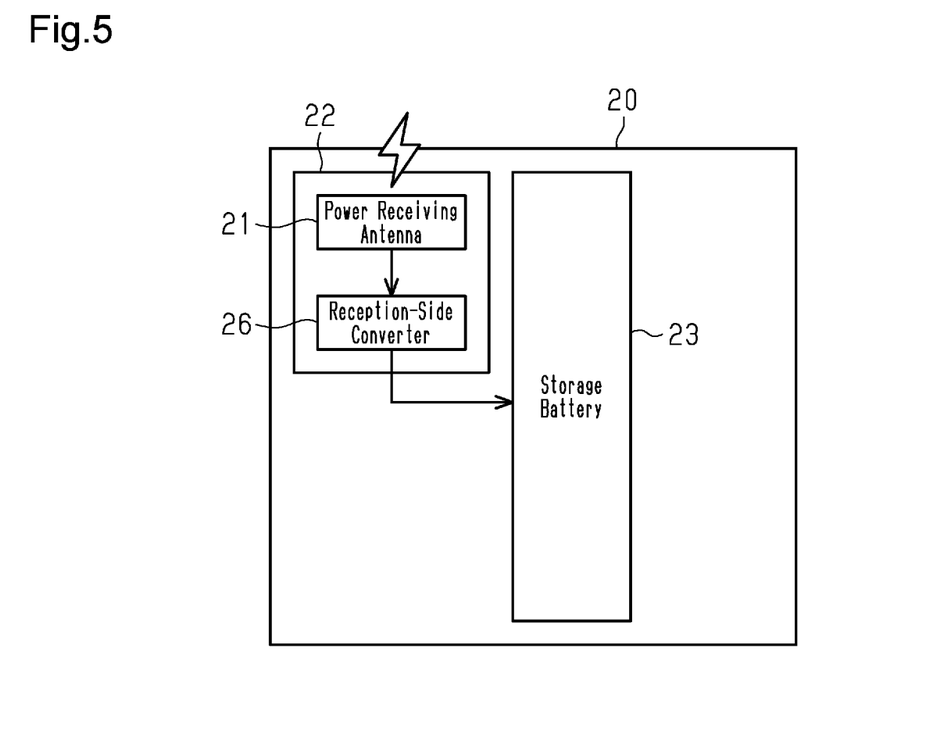
FIG. 5 is a diagram illustrating how the charger receives power.

As shown in FIG. 5, the charger 20 receives the power transfer signal by controlling the activation of the power receiving antenna 21. Then, the reception-side converter 26 of the charger 20 converts the power transfer signal into direct-current power and supplies the direct-current power to the storage battery 23. The supplied direct-current power is used to charge the storage battery 23.

In the charger 20 of the present embodiment, the storage battery 23 is charged through wireless power supply via radio waves. Thus, the electrical device can be charged with the power stored in the storage battery 23 using the power transmitting unit 24. This eliminates the need to supply power to the charger 20 in a wired manner using a connection cord and a power supply terminal (e.g., an accessory socket or a USB port). Accordingly, there is no limit to the location for installing the charger 20 that would be caused by the position of the power supply terminal. This increases the degree of freedom of the installment location of the charger 20.

The distance (e.g., several meters) by which power can be transferred through wireless power supply via radio waves is longer than the distance (e.g., several centimeters) by which power can be transferred through wireless power supply via electromagnetic induction. In the present embodiment, power is supplied from the power transmitting device 10 to the charger 20 through wireless power supply via radio waves. As compared to when power is supplied through wireless power supply via electromagnetic induction, power can be transmitted a longer distance and thus the charger 20 can be used at a position separated from the power transmitting device 10. This increases the degree of freedom of the installment location of the charger 20. Thus, in the present embodiment, an increase in the degree of freedom of the installment location of the charger 20 allows the charger 20 to be installed at a place where the charger 20 can be readily used. As a result, the charger 20 is easier to use.

In the present embodiment, an occupant can use the charger 20 in the passenger compartment with the charger 20 removed from the armrest 3. The occupant can also use the charger 20 at the outside of the vehicle 1 with the charger 20 removed from the armrest 3.

Figure 6:
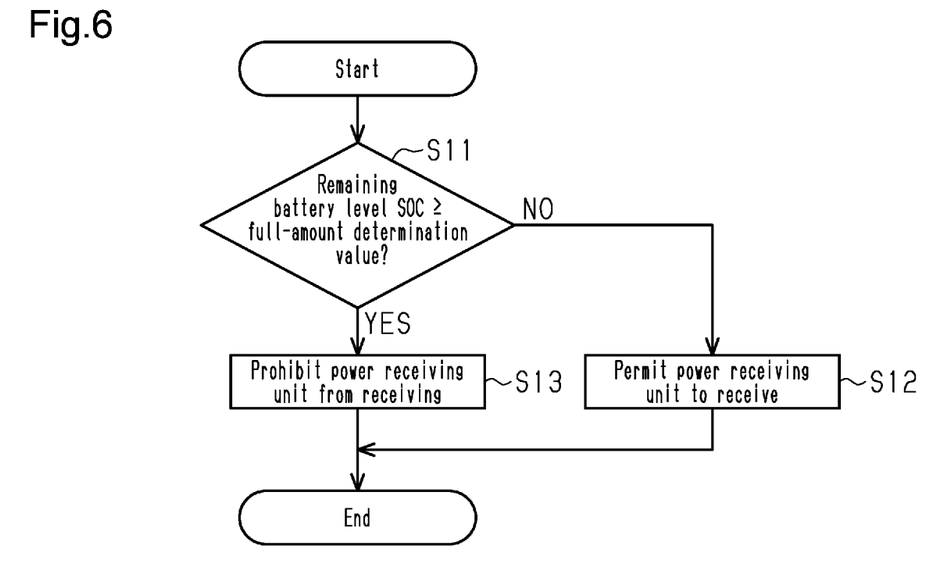
FIG. 6 is a flowchart illustrating a procedure for executing processes related to activation control of the power receiving unit.

FIG. 6 shows a procedure for executing processes related to activation control of the power receiving unit 22. The series of processes shown in the flowchart of FIG. 6 is executed by the controller 25 for the charger 20 at predetermined intervals.

In the present embodiment, as shown in FIG. 6, when the remaining battery level SOC is less than a full-amount determination value (e.g., a value equivalent to a full charge; i.e., 100%) (step S11: NO), the power receiving unit 22 of the charger 20 is permitted to receive a power transfer signal (step S12). That is, the charger 20 can receive the power transmitted from the power transmitting device 10.

When the remaining battery level SOC is greater than or equal to the full-amount determination value (step S11: YES), the power receiving unit 22 of the charger 20 is prohibited from receiving a power transfer signal (step S13). In this case, the charger 20 does not receive the power transfer signal (i.e., the power transmitted from the power transmitting device 10). In the present embodiment, the power transmitting device 10 is prohibited (stopped) from transmitting a power transfer signal to the charger 20.

To charge the electrical device using the charger 20, the power stored in the storage battery 23 is consumed. Thus, the remaining battery level SOC of the storage battery 23 decreases. To stop charging the electrical device using the charger 20, the power received by the power receiving unit 22 is basically used to charge the storage battery 23. Thus, the remaining battery level SOC of the storage battery 23 increases.

In the present embodiment, the charging of the storage battery 23 can be stopped on condition that the charging of the storage battery 23 caused the remaining battery level SOC of the storage battery 23 to reach an appropriate amount. This keeps the storage battery 23 charged appropriately. Additionally, since the power transmitting device 10 is prohibited from transmitting a power transfer signal, the power transfer signal avoids being transmitted more than necessary. This lowers the power consumed by the power transmitting device 10.

Power Transmission by Power Transmitting Unit 24 to Electrical Device

To charge the electrical device using the charger 20, the electrical device is placed on the housing 30 with the operation switch 31 (FIG. 4) turned on. This causes the electrical device to be charged through wireless power supply via electromagnetic induction.

Figure 7:
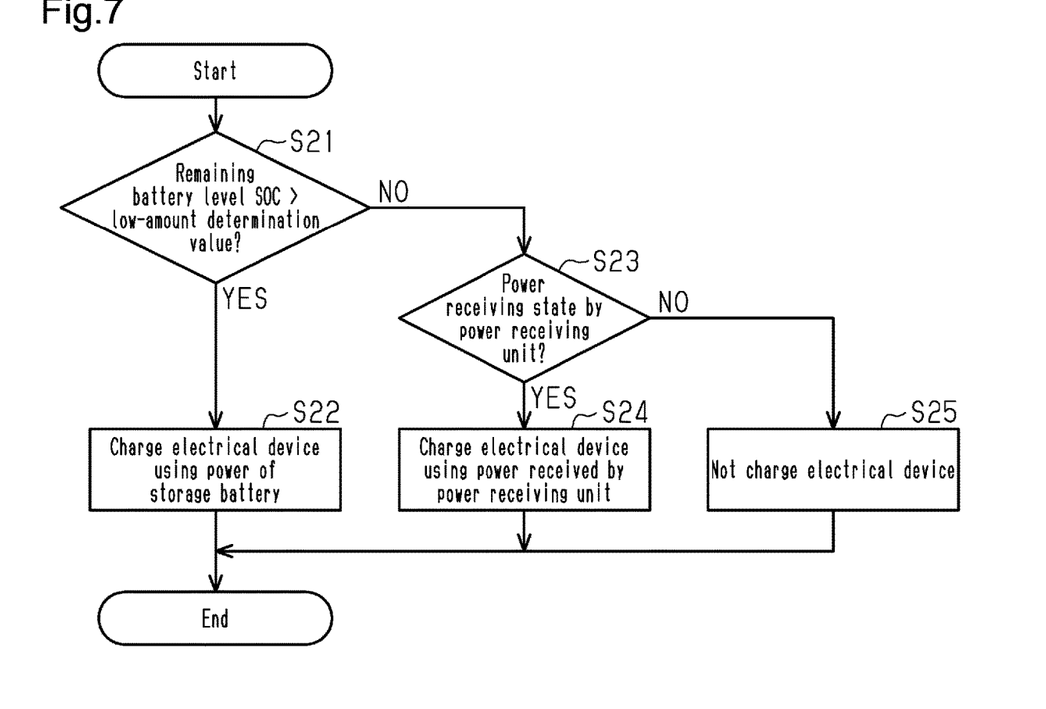
FIG. 7 is a flowchart illustrating a procedure for executing processes related to activation control of the power transmission unit.

FIG. 7 shows a procedure for executing processes related to activation control of the power transmitting unit 24. The series of processes shown in the flowchart of FIG. 7 is executed by the controller 25 for the charger 20 at predetermined intervals.

As shown in FIG. 7, when the remaining battery level SOC of the storage battery 23 is greater than a low-amount determination value (e.g., the power remaining amount is a value equivalent to 0; i.e., 0%) (step S21: YES), the electrical device is charged using the power of the storage battery 23 (step S22).

Figure 8:
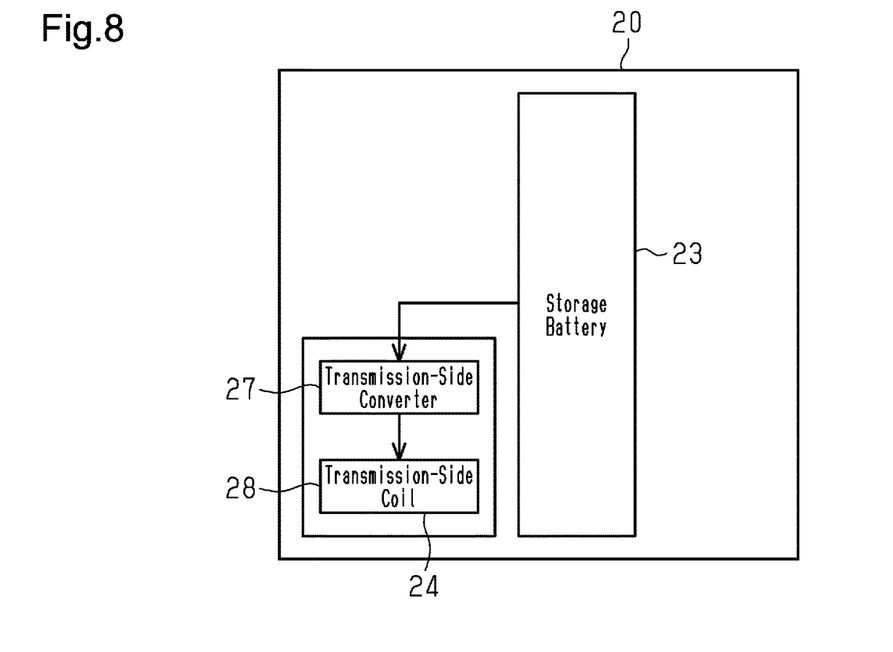
FIG. 8 is a diagram illustrating how the charger performs charging in an example.

In this case, as shown in FIG. 8, the transmission-side converter 27 converts the direct-current power supplied from the storage battery 23 into alternating-current power and transmits the alternating-current power to the transmission-side coil 28. This causes the transmission-side coil 28 to produce magnetic flux for wireless power supply. The magnetic flux is used to produce an induced electromotive force in the reception-side coil of the electrical device. The induced electromotive force is used to charge the storage battery of the electrical device.

Wireless power supply via electromagnetic induction transmits power more efficiently than wireless power supply via radio waves. In the present embodiment, power is supplied from the charger 20 to the electrical device through wireless power supply via electromagnetic induction. Thus, as compared to when power is supplied through wireless power supply using radio waves, the electrical device can be transmitted more efficiently.

As shown in FIG. 7, when the remaining battery level SOC of the storage battery 23 is less than or equal to the low-amount determination value (step S21: NO) and the power receiving unit 22 is in a power receiving state of receiving power (step S23: YES), the electrical device is charged as follows (step S24). In this case, the electrical device is charged using the power received by the power receiving unit 22.

Figure 9:
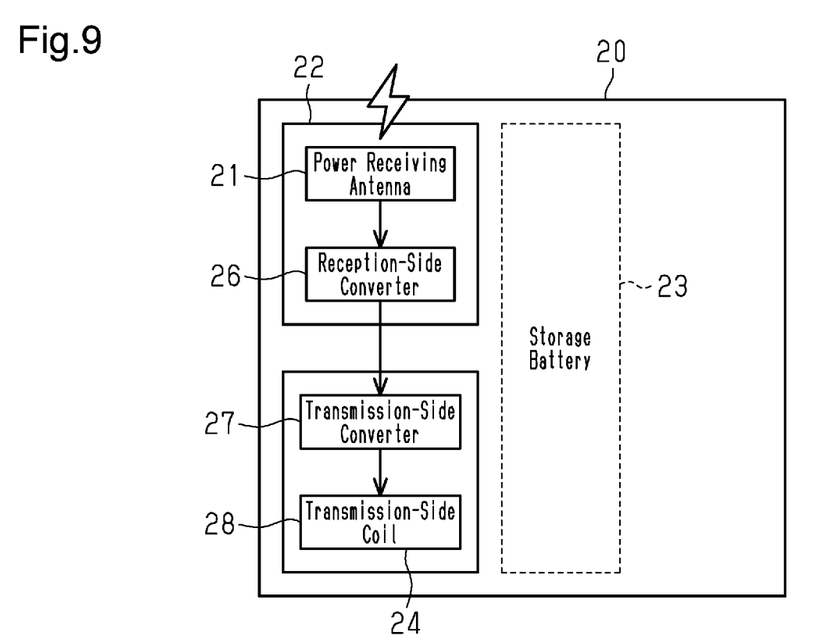
FIG. 9 is a diagram illustrating how the charger performs charging in another example.

More specifically, as shown in FIG. 9, the direct-current power obtained through conversion by the reception-side converter 26 is supplied to the transmission-side converter 27. The transmission-side converter 27 then converts, into alternating-current power, the direct-current power supplied from the power receiving unit 22 and transmits the alternating-current power to the transmission-side coil 28. This causes the transmission-side coil 28 to produce magnetic flux for wireless power supply. The magnetic flux is used to produce an induced electromotive force in the reception-side coil of the electrical device. The induced electromotive force is used to charge the storage battery of the electrical device. In this case, the direct-current power obtained through conversion by the reception-side converter 26 is not used to charge the storage battery 23, and no power is supplied from the storage battery 23 to the transmission-side converter 27.

The charger 20 of the present embodiment is different from a charger connected to a power supply device using a power supply cord in that the electrical device cannot be charged when the amount of power remaining in the storage battery 23 is relatively low due to some reason.

In the present embodiment, when the remaining battery level SOC of the storage battery 23 is less than or equal to the low-amount determination value, the power stored in the storage battery 23 is prohibited from being transmitted to the electrical device. Thus, when the remaining amount of the power stored in the storage battery 23 is relatively low, the power will not be used to charge the electrical device. This limits situations in which the electrical device is charged more than necessary using the power stored in the storage battery 23, thereby limiting an unnecessary decrease in the amount of power remaining in the storage battery 23.

Even in such a case, when the power receiving unit 22 is in the power receiving state, the power received by the power receiving unit 22 is transmitted to the electrical device. Thus, the use of the power stored in the storage battery 23 is prohibited to limit a decrease in the amount of power remaining in the storage battery 23. Further, the power received by the power receiving unit 22 is used to keep the function of charging the electrical device.

As shown in FIG. 7, when the remaining battery level SOC of the storage battery 23 is less than or equal to the low-amount determination value (step S21: NO) and the power receiving unit 22 is in a power non-receiving state, in which no power is received (step S23: NO), the electrical device is not charged (step S25).

In this case, the remaining amount of the power stored in the storage battery 23 is determined as being relatively low. Thus, the power will not be used to charge the electrical device. This limits situations in which the electrical device is charged more than necessary using the power stored in the storage battery 23, thereby limiting an unnecessary decrease in the amount of power remaining in the storage battery 23. Further, since the power receiving unit 22 is in the power non-receiving state, the power received by the power receiving unit 22 cannot be transmitted to the electrical device. Thus, that power will not be transmitted to the electrical device.

Advantages

As described above, the present embodiment provides the following advantages.

(1) The charger 20 includes the power receiving unit 22, which is configured to receive, through wireless power supply via radio waves, the power transmitted from the power transmitting device 10 in the vehicle 1. The charger 20 also includes the storage battery 23, which is configured to be supplied and charged with the power received by the power receiving unit 22. The charger 20 further includes the power transmitting unit 24, which is configured to transmit, through wireless power supply via electromagnetic induction, the power stored in the storage battery 23 to an electrical device that is to be charged. This increases the degree of freedom of the installment location of the charger 20 and thus makes the charger 20 easier to use.

(2) The charger 20 is attached to the armrest 3 for the rear seat 2 in the passenger compartment. This allows the occupant to readily use the charger 20 in the passenger compartment.

(3) When the remaining battery level SOC of the storage battery 23 is less than or equal to the low-amount determination value, the power stored in the storage battery 23 is prohibited from being transmitted to the electrical device. This limits situations in which the electrical device is charged more than necessary using the power stored in the storage battery 23, thereby limiting an unnecessary decrease in the amount of power remaining in the storage battery 23.

(4) When the remaining battery level SOC of the storage battery 23 is less than or equal to the low-amount determination value but the power receiving unit 22 is in the power receiving state, the electrical device is charged with the power received by the power receiving unit 22. Thus, the use of the power stored in the storage battery 23 is prohibited to limit a decrease in the amount of power remaining in the storage battery 23. Further, the power received by the power receiving unit 22 is used to keep the function of charging the electrical device.

(5) When the remaining battery level SOC of the storage battery 23 is greater than or equal to the full-amount determination value, the power receiving unit 22 is prohibited from receiving the power transmitted from the power transmitting device 10. This keeps the storage battery 23 charged appropriately.

(6) The charger 20 includes the operation switch 31, which is configured to switch between the power transmission permitted state and the power transmission prohibited state. Thus, the power transmitting unit 24 is prevented from transmitting power more than necessary. This keeps the charger 20 capable of charging the electrical device, while also reducing the power consumed by the charger 20.

Modifications

The above embodiment may be modified as follows. The above embodiment and the following modifications can be combined as long as the combined modifications remain technically consistent with each other.

The display device 32, which displays the remaining battery level SOC, may be omitted.

A non-replaceable storage battery 23 may be arranged in the housing 30.

The charger 20 may include a wired charging unit that transmits power to an electrical device that is charged through wired power supply using a charging cord. The wired charging unit includes, for example, a connection terminal to which the charging cord is connected and a connection circuit which connects the connection terminal to the storage battery 23 (or the reception-side converter 26). The charging cord may be a cord of a USB standard (e.g., Type-A, Type-B, or Type-C).

The power storage unit that is supplied and charged with the power received by the power receiving unit 22 is not limited to the storage battery 23 and may be a capacitor.

The operation switch 31 is not limited to a slide switch and may be a physical switch (e.g., a touch switch).

The operation switch 31 may be omitted.

When the remaining battery level SOC is greater than or equal to the full-amount determination value, the power receiving unit 22 does not have to be prohibited from receiving a power transfer signal (see FIG. 6). In other words, when the remaining battery level SOC has any value, the power receiving unit 22 may be permitted to receive a power transfer signal.

The electrical device does not have to be charged using the power received by the power receiving unit 22. Specifically, the processes of steps S23 and S24 may be omitted.

When the remaining battery level SOC is less than or equal to the low-amount determination value, the electrical device does not have to be charged using the power of the storage battery 23. In other words, when the remaining battery level SOC has any value, the electrical device may be permitted to be charged using the power of the storage battery 23.

The power transmitting device 10 may be installed at any location if the power transmitting device 10 can transmit a power transfer signal into the vehicle 1 from that location. Examples of the installment location for the power transmitting device 10 include the inside of a glovebox, a center cluster, or the floor of the vehicle 1. The power transmitting device 10 may be located in the luggage compartment of the vehicle 1.

The charger 20 does not have to be attached to the armrest 3 in a removable manner and may be fixed to the armrest 3.

The charger 20 may be attached to a vehicle on-board component other than the armrest 3. Examples of the vehicle on-board component include a center console, a glovebox, a dashboard, the seating section of a rear seat, the headrest of a seat, and a table. Alternatively, the charger 20 may be located in the luggage compartment of the vehicle 1.

The vehicle 1 does not have to include only one charger 20. Instead, there may be multiple chargers 20 (e.g., one charger 20 in the center console and one charger 20 in the armrest 3).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A charger comprising:
a power receiving unit configured to receive, through wireless power supply via radio waves, power transmitted from a power transmitting device disposed in a vehicle;
a power storage unit configured to be supplied and charged with the power received by the power receiving unit; and
a power transmission unit configured to transmit, through wireless power supply via electromagnetic induction, the power stored in the power storage unit to an electrical device that is to be charged, wherein
the power transmission unit is prohibited from transmitting the power stored in the power transmission unit to the electrical device when a remaining amount of the power is less than or equal to a predetermined low-amount determination value, and
the power transmission unit is configured to transmit, through wireless power supply via electromagnetic induction, the power received by the power receiving unit to the electrical device when the remaining amount is less than or equal to the low-amount determination value and the power receiving unit is receiving the power transmitted from the power transmitting device.

2. The charger according to claim 1, wherein the power transmission unit is attached to a vehicle on-board component disposed in a passenger compartment.

3. The charger according to claim 1, wherein the power receiving unit is prohibited from receiving the power transmitted from the power transmitting device when a remaining amount of the power stored in the power receiving unit is greater than or equal to a predetermined full-amount determination value.

4. The charger according to claim 1, further comprising a physical switch configured to switch between a state in which power transmission from the power transmission unit to the electrical device is permitted and a state in which the power transmission is prohibited.

* * * * *